(12) United States Patent
van Bavel et al.

(10) Patent No.: US 6,665,347 B2
(45) Date of Patent: Dec. 16, 2003

(54) OUTPUT DRIVER FOR HIGH SPEED ETHERNET TRANSCEIVER

(75) Inventors: Nicholas van Bavel, Austin, TX (US); Eric James Wyers, Austin, TX (US); John James Paulos, Austin, TX (US)

(73) Assignee: Cicada Semiconductor, Inc., Austin, TX (US)

( * ) Notice: Subject to any disclaimer, the term of this patent is extended or adjusted under 35 U.S.C. 154(b) by 232 days.

(21) Appl. No.: 09/894,388

(22) Filed: Jun. 28, 2001

(65) Prior Publication Data

US 2003/0020518 A1 Jan. 30, 2003

(51) Int. Cl.[7] .......................... H03K 17/16; H04B 3/00
(52) U.S. Cl. .................. 375/257; 375/258; 326/30; 326/82; 327/108
(58) Field of Search ..................... 375/219, 220, 375/222, 357, 358; 326/30, 62, 82, 84, 92; 327/108, 110, 112, 113; 330/255, 257, 262; 709/203

(56) References Cited

U.S. PATENT DOCUMENTS

| | | | | |
|---|---|---|---|---|
| 4,061,883 A | * | 12/1977 | Chambers, Jr. | 379/343 |
| 5,920,204 A | * | 7/1999 | Bruno | 326/86 |
| 6,175,255 B1 | * | 1/2001 | Mohan | 327/108 |
| 6,259,745 B1 | * | 7/2001 | Chan | 375/285 |
| 6,265,833 B1 | * | 7/2001 | Kim et al. | 315/169.3 |
| 6,351,185 B1 | * | 2/2002 | Amrany et al. | 330/253 |
| 6,377,122 B1 | * | 4/2002 | Rokhsaz | 330/253 |
| 6,593,770 B2 | * | 7/2003 | Hernandez-Marti | 326/30 |

* cited by examiner

Primary Examiner—Young T. Tse
(74) Attorney, Agent, or Firm—Howison & Arnott, L.L.P.

(57) ABSTRACT

Output driver for high speed Ethernet transceiver. A transmission line driver is disclosed for driving a transmission line in a first operating mode and in a second operating mode. The first and second operating modes operate substantially exclusive of each other. A current driver is provided for driving the transmission line in the first operating mode from a first data generator and at a first output voltage. A voltage driver is provided for driving the transmission line in the second operating mode from a second data generator at a second output voltage through a load, such that the current driver and the voltage driver operate independent of each other.

41 Claims, 4 Drawing Sheets

OUTPUT DRIVER FOR HIGH SPEED ETHERNET TRANSCEIVER

TECHNICAL FIELD OF THE INVENTION

The present invention pertains in general to an Ethernet transceiver, and more particularly, to an output driver for a combined 10/100/1000 BaseT Ethernet transceiver.

BACKGROUND OF THE INVENTION

During the 1980's and 1990's, the growth and use of computer networks increased at a phenomenal rate. The mind set of decision-makers in any type of business, be it a large business or a small business, changed from deciding whether they needed networks to deciding what type of network should be employed in their particular business. This was a result, in part, of the parallel growth and the capabilities of devices connectible to the network such as personal computers, work stations, servers, etc. Additionally, the applications utilizing networks have further evolved to create some obsolescence in previous network technologies. One type of network, Ethernet, has seen an evolution from the first stage of being accepted as a viable network interconnection architecture to one wherein the speeds of the network have changed. Prior to the 1980's, the experimental Ethernets operated at a rate of 3 Mb/s. In the early 80's, the DIX specification was set forth for a 10 Mb/s coaxial cable Ethernet. This particular speed or data rate evolved up to the IEEE 802.3 10BASE-T standard, which resulted in use with thin wire coaxial cable and then to use with an unshielded twisted pair in the early 90's. This further developed into the 100BASE-T twisted pair standard which allowed a much higher speed data path. In the late 1990's, the IEEE 802.3 1000BASE-T standard was set forth which provided for a Gigabit Ethernet.

One of the problems with providing hardware for the Gigabit Ethernet is that associated with reverse compatibility. Most Ethernet controllers in the marketplace are required to handle the 10BASE-T and 1000BASE-T Ethernet standards, such that they can be used in association with compatible physical medians. This presents a problem to a designer due to the fact that the 10BASE-T operates on a different voltage level than the 1000BASE-T and the power requirements for each are distinctly different. A one volt peak differential voltage is now required for the 100 and 1000BASE-T standards and a 2.5 volt peak differential voltage is required for the 10 BASE-T device. Some technologies have utilized different hardware to provide the compatibility for the different standards. This, of course, has increased the complexity of these devices.

SUMMARY OF THE INVENTION

The present invention disclosed and claimed herein, in one aspect thereof, comprises a transmission line driver for driving a transmission line in a first operating mode and in a second operating mode. The first and second operating modes operate in a mutually exclusive manner. A current driver is provided for driving the transmission line in the first operating mode from a first data generator and at a first output voltage. A voltage driver is provided for driving the transmission line in the second operating mode from a second data generator at a second output voltage through a load, such that the current driver and the voltage driver operate independent of each other.

BRIEF DESCRIPTION OF THE DRAWINGS

For a more complete understanding of the present invention and the advantages thereof, reference is now made to the following description taken in conjunction with the accompanying Drawings in which.

DETAILED DESCRIPTION OF THE INVENTION

Figure 1:
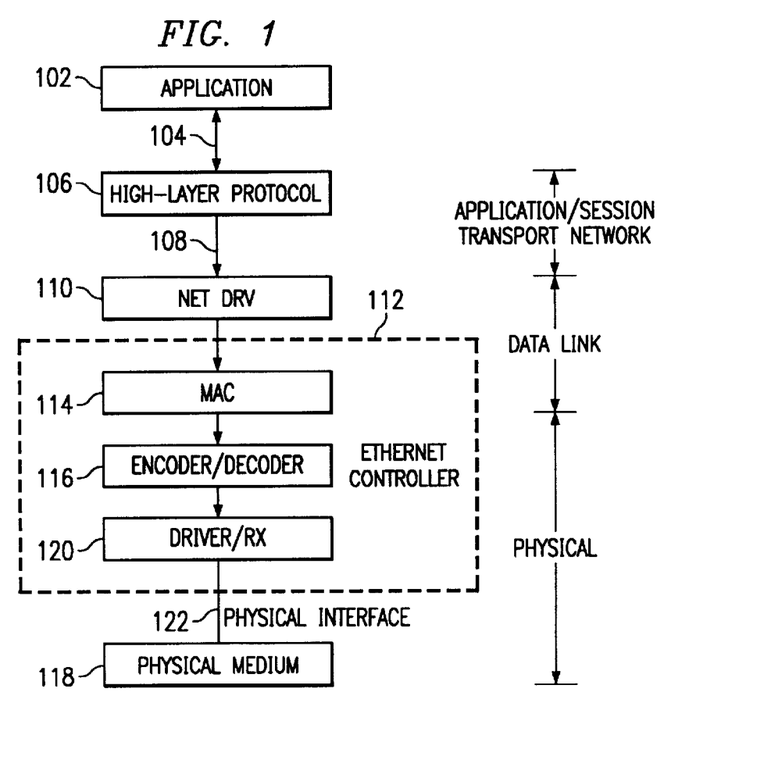
FIG. 1 illustrates an overall diagrammatic view of a system utilizing an Ethernet controller according to the present disclosure.

Referring now to FIG. 1, there is illustrated a diagrammatic view of a high-level system architecture for a generalized gigabit Ethernet station. This is a conceptual architecture that is somewhat simpler than the standardized version. This standardized version is represented in the IEEE 802.3z standard that is set forth by the IEEE 802 Local Area Network/Metropolitan Area Network Standards Committee (LMSL). This embodiment of FIG. 1, due to the conceptual nature thereof, does not illustrate the actual internal model that would be present in a typical gigabit system. In general, the gigabit Ethernet is comprised of a data link and a physical layer technology only and, as such, requires no changes to high-layer protocols or applications. These applications will accommodate the 10 Mb/s, 100 Mb/s or 1000 Mb/s.

There is provided at the application level, an application block 102 which provides for such things as file transfer, e-mail and such, which is then interfaced through an application programming interface 104 to the various high-layer protocols in block 106. This is then interfaced through a driver interface 108 to a network device driver block 110. The high-layer protocols are such things as TCP/IP, and such. The network device driver is then operable to interface with a gigabit Ethernet network controller 112. This is comprised of first a gigabit Ethernet MAC 114 which provides for both half-duplex and full-duplex operation. The network device driver block 110 and MAC 114 comprise the data link portion. The MAC 114 is interfaced with an encoder/decoder block 116 which is then operable to interface with a physical medium 118 through a driver/receiver block 120. The encoder/decoder 116, driver/receiver 120 and the physical medium 118 all comprise the physical layer, with the driver/receiver 120 interfacing to the physical medium 118 through a physical interface 122. Everything above the physical medium 118 comprises the overall gigabit Ethernet station. This is described in more detail in R. Seifert, "*Gigabit Ethernet, technology and applications for high-speed LANs,*" Addison-Wesley (1998), pp. 143–158.

Figure 2:
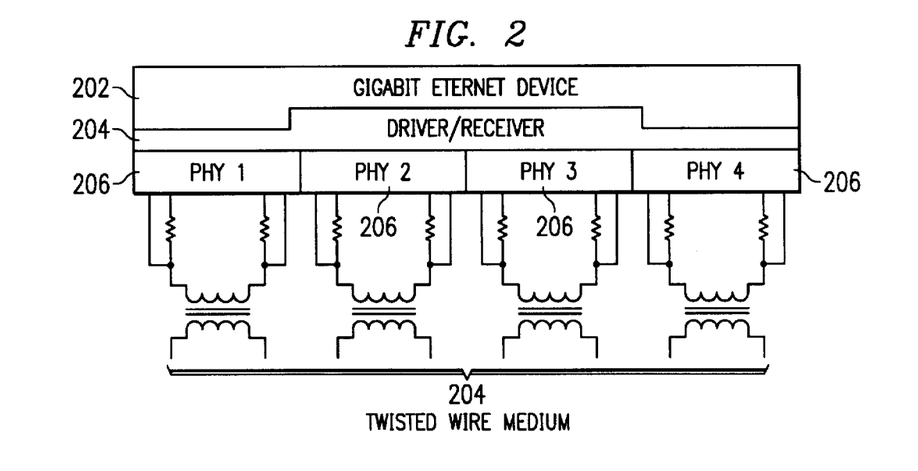
FIG. 2 illustrates the I/O interface of the Ethernet controller with the physical medium.

The physical medium 118 in the present application is comprised of a gigabit Ethernet device or Ethernet station 202 that interfaces with a twisted wire medium 204. The twisted wire pair, which was originally utilized due to the ease of installation, was seen in the early days of high-speed Ethernet to have some inherent problems. The bandwidth capacity of a twisted wire pair is typically inferior to that of most coaxial cables, as well as the impedance of coaxial cable being much better controlled than that of twisted pairs. In general, coaxial cable was primarily used for the 10 Mb/s Ethernet while twisted-pair was used in large part for the high speed 100 Mb/s systems. Most Ethernet connections have migrated from the coaxial based systems to twisted wire pair systems and, as such, there is a significant installed base of twisted wire pair LANs.

In a 10BASE-T link, there are typically provided two pairs of wires, one for transmitting and one for receiving, since only four wires are required. However, the standard requires a twisted wire pair transmission link to have eight wires (four twisted wire pairs). In the 100BASE-T operation, there is a provision for full duplex operation, which also utilizes two pairs of wires.

In the gigabit application, as described hereinabove, all three modes of operation, 10 Mb/s, 100 Mb/s and 1000 Mb/s must be accommodated. To provide for the high speed gigabit operation, multiple channels are utilized, such that each two wire pair in the eight wires will carry one fourth of the data traffic for the gigabit operation, each pair operating in a full-duplex mode of operation.

Referring further to FIG. 2, the Ethernet device 202 is provided on one output thereof with a driver 204 which is comprised of four physical layers 206, one labeled PHY 1, one labeled PHY 2, one labeled PHY 3 and one labeled PHY 4. In the operation of the Ethernet device 202, the 10 Mb/s operation is required to have a nominal 2.5 volt peak differential at the output whereas the 100 and 1000 Mb/s modes require a nominal one volt peak differential, both the nominal 2.5 and one volt peak differential values have a built in tolerance. However, support of the 10 Mb/s and the 100 Mb/s operation, from a processing standpoint, is significantly less complicated and slower than that associated with the gigabit operation. This directly translates to power considerations. As such, the voltage levels are reduced as much as possible for the overall operation. Typically, the power supply voltages for the gigabit parts in the industry are set at 3.3 volts as compared to 5.0 volts.

Figures 3, 4A, 4B:
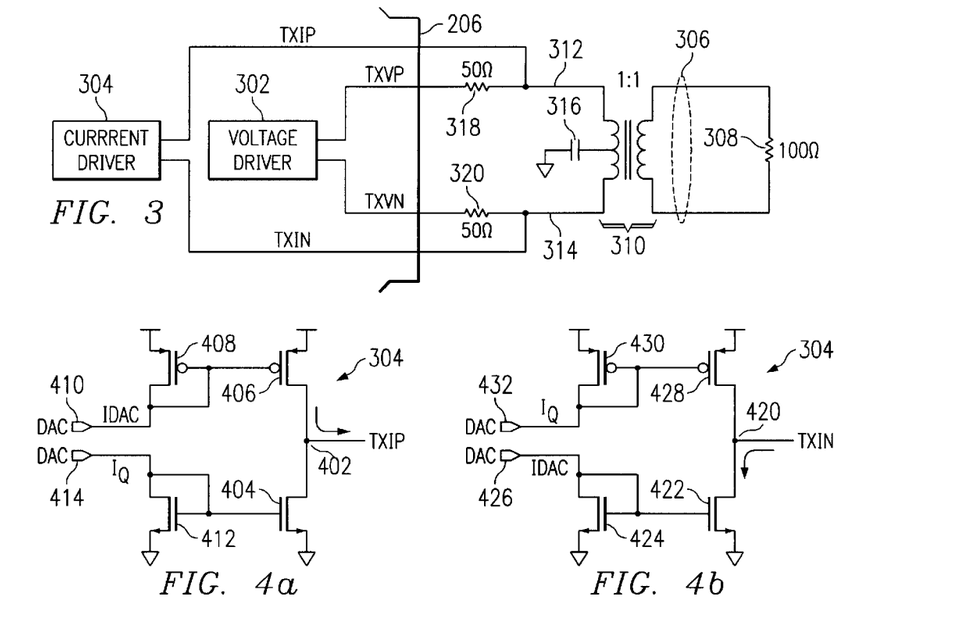
FIG. 3 illustrates a more detailed diagram of the embodiment of FIG. 2 illustrating only one physical layer interfaced with two wires of the core twisted pair Ethernet cable.
FIGS. 4a and 4b illustrate the 10BASE-T current driver.

Referring now to FIG. 3, there is illustrated a more detailed diagrammatic view of one of the physical layers 206 associated with one pair of wires in the twisted wire medium. In accordance with the present disclosure, there is provided a voltage driver 302 for generating positive and negative driving voltages txvp and txvn, respectively, for use with the 100 Mb/s and the 1000 Mb/s modes of operation. A current driver 304 is provided for the 10 Mb/s operation. The gigabit operation, if it were implemented with a current driver, would require a more complex active hybrid, resulting in increased power consumption. Therefore, voltage mode is better suited for the high speed operation, wherein the hybrid is easier to implement, noting that a hybrid is only required in the gigabit mode due to the use of simultaneous transmission and reception.

On the exterior of the device, the twisted wire pair from the overall eight wire twisted wire medium is provided as two wires 306. The load on this pair is represented as a 100 ohm load 308. These two wires are input to one side of a 1:1 transformer 310. The other side is interfaced to two wires 312 and 314 from the other side of the transformer 310. The center tap of this other side of the transformer 310 is connected to the ground through a capacitor 316.

Wire 314 is connected directly to one output of the current driver 304 and wire 312 is connected to the other output of the current driver 304, the output connected to the wire 312 being the positive current drive signal txip, and the wire 314 connected to the negative drive signal txin. The wire 312 is input through a resistor 318 to the txvp signal from the voltage driver 302 and the wire 314 is connected through a resistor 320 to the txvn output of voltage driver 302. The resistors 318 and 320 are nominally 50 ohm resistors.

As can be seen from the embodiment of FIG. 3, the 10 Mb/s operational mode is facilitated with a current driver, whereas the 100 Mb/s and 1000 Mb/s modes are implemented with a voltage driver. There is provided a hybrid (not shown) which is implemented on chip for the 1000 Mb/s mode of operation. This will be described in more detail hereinbelow.

In operation, the gigabit Ethernet device will operate in one of the three modes, 10 Mb/s, 100 Mb/s or 1000 Mb/s. This is determined through an Auto Negotiation scheme. Once this is determined, then the data is configured and appropriately encoded, if necessary, and then transmitted to the appropriate port in the appropriate mode. In this mode, the current driver 304 is selected for the 10 Mb/s mode and the voltage driver 302 is selected for either of the 100 Mb/s or the 1000 Mb/s modes. The current driver 304 and the voltage driver 302 are both driven by a DAC in the disclosed embodiment, as will be described hereinbelow. These are current DACs.

In the disclosed embodiment, there are two modes of operation disclosed, one where the voltage driver drives the load independent of the current driver and one where the current mode driver drives the load substantially independent of the voltage driver. In the second mode, the current driver mode associated with the 10BASE-T mode of operation, the voltage driver provides a common mode voltage therefor, although this could be provided by an independent source. However, there is considered a configuration where each mode of operation or any single mode of operation with any of the 10/100/1000BASE-T operational modes, could derive drive power from both of the voltage and current drivers. This would be a hybrid mode of operation.

Referring now to FIGS. 4a and 4b, there are illustrated schematic diagrams of the current driver 304. FIG. 4a illustrates the current driver associated with the txip output and the embodiment of FIG. 4b illustrates the txin current driver. Referring specifically to the view of FIG. 4a, the output txip is provided on a node 402 which is connected on one side thereof to the drain of an N-channel transistor 404, the source thereof connected to ground, and node 402 also connected to the drain of the P-channel transistor 406. The source is connected to the $V_{dd}$. The gate of transistor 406 is connected to the gate of a P-channel transistor 408, the source thereof connected to the $V_{dd}$ and the gate and drain thereof connected to a current DAC 410. The gate of transistor 404 is connected to the gate of an N-channel transistor 412, the source thereof connected to the ground and the drain and gate thereof connected to a current DAC 414.

With specific reference to FIG. 4b, the output txin is connected to a node 420, which node is connected to the drain of an N-channel transistor 422, the source thereof connected to ground and gate connected thereof to an N-channel transistor 424. N-channel transistor 424 has the source thereof connected to ground and the drain thereof and gate thereof connected to a DAC 426. Node 420 is also connected to the drain of a P-channel transistor 428, the source thereof connected to $V_{dd}$ and to the gate of a P-channel transistor 430. Transistor 430 has the source thereof connected to $V_{dd}$ and the gate and drain thereof connected to a DAC 432.

Each of the DACs 410, 414, 432, and 426 are current DACs and with a current associated therewith of $I_{DAC}$. In operation, when current is being driven out of node 402 and into node 420, since they are connected together through the transformer 310, the current will flow out of DAC 426 and into DAC 410. When current is being driven out of node 420 and into node 402, the current will flow out of DAC 414 and into DAC 432. With a 3.3 volt supply, the 2.5 volt peak differential output voltage can be supported for the 10 Mb/s mode.

Figure 5:
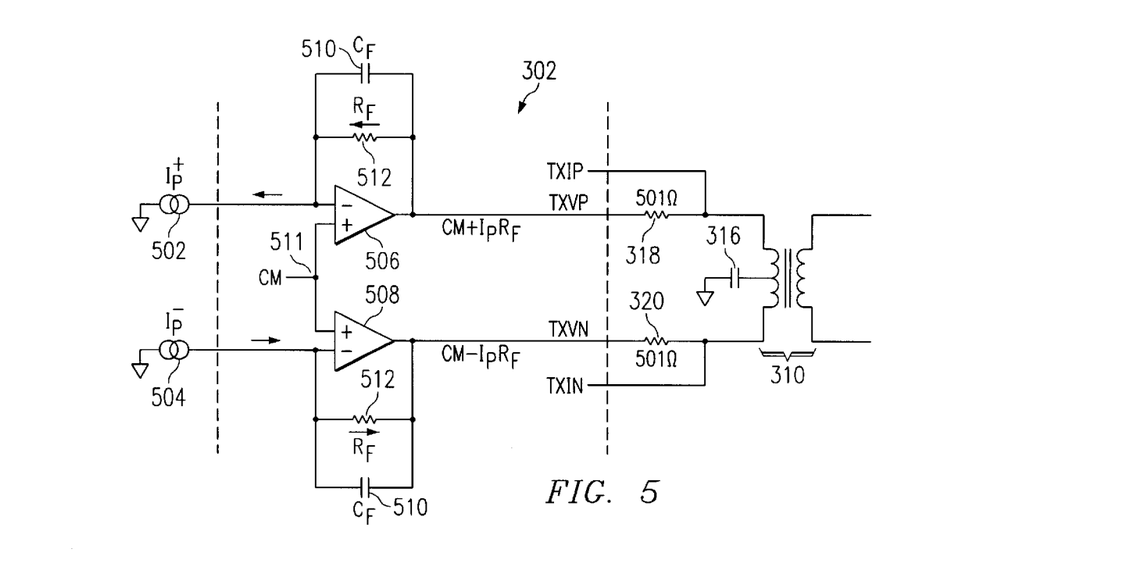
FIG. 5 illustrates a logic diagram for the voltage driver for the 100/1000BASE-T driver.

Referring now to FIG. 5, there is illustrated a simplified logic diagram for the voltage driver 302. There are provided two current DACs 502 and 504 for driving the negative input of two differential amplifiers 506 and 508. The positive inputs of each of the differential amplifiers 506 and 508 are connected to a common mode voltage on a node 511. Each of the differential amplifiers 506 and 508 have a feedback network comprised of a feedback capacitor 510 and a feedback resistor 512 connected in parallel and between the respective negative input and output thereof.

In operation, when current ($I_p$) is being drawn from the negative node by current DAC 502, current will flow from the output of differential amplifier 506 to the input thereof through the feedback resistor 512 associated therewith. This will result in a voltage on the output of differential amplifier 506 of the common mode voltage (CM) added to the voltage across the feedback resistor 512, $I_p R_f$, that is: $CM + I_p R_f$. The DAC 504 will push current to the negative input of the differential amplifier 508 and the associated current will flow from the input to the output through feedback resistor 512. This will result in a voltage on the output differential amplifier 508 of $CM - I_p R_f$. If the voltage $I_p R_f$ were equal to 1.0 volts, this would result in a voltage of 0.5 on the transformer side of resistor 318 and −0.5 on the transformer side of resistor 320, resulting in a +1.0 differential voltage on the other side of the transformer 310. It can be seen that, if the voltage divider were utilized with respect to the 10 Mb/s mode, this would require a much higher voltage across the feedback resistor 512, i.e., at least 2.5 volts. Since the voltage requirement for the 10 Mb/s is 2.5 volts peak differential as compared to the 1.0 volt peak differential required for 1000 Mb/s, a considerably larger amount of power would be required to operate all three modes with a voltage driver and a voltage above the power supply voltage of 3.3 volts would be required. By utilizing the current driver for the 10 Mb/s mode and the voltage driver for the 100 Mb/s and the 1000 Mb/s modes, the voltage loss across resistors can be alleviated. Further, since the voltage driver is utilized for the 1000 Mb/s mode, a more simplified hybrid can be utilized.

Figure 6:
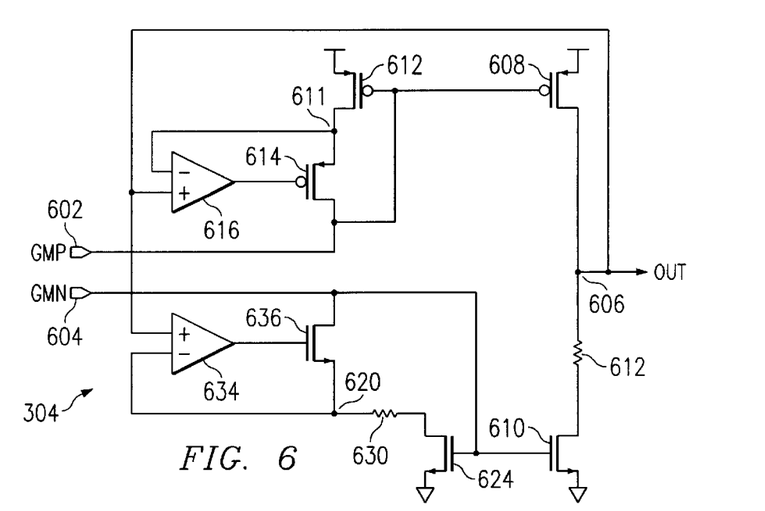
FIG. 6 illustrates a schematic diagram of one leg of the current driver.

Referring now to FIG. 6, there is illustrated a more detailed schematic diagram for one leg of the current driver 304 illustrated in FIGS. 4a and 4b, which is a single ended push/pull current driver. This achieves wide swing with good linearity. The outputs from the associated DACs are input to input terminals 602 and 604, terminals 602 labeled gmp and terminal 604 labeled gmn. The output on a node 606 is driven by a P-channel transistor 608 with the source/drain thereof connected between $V_{dd}$ and node 606 and with an N-channel transistor 610 having the source/drain path thereof connected between ground and through a series resistor 612 to node 606. The gate of transistor 608 is connected to the gate of a P-channel transistor 612, the source/drain path thereof connected between $V_{dd}$ and the gmp terminal 602. A P-channel transistor 614 has the source/drain path thereof connected in series with the source/drain path of transistor 612 at a node 611 on one side thereof and the DAC terminal 602 for the gmp signal on the other side thereof, and the gate thereof connected to the output of a differential amplifier 616. Differential amplifier 616 is an error correction amplifier with the positive input thereof connected to a feedback signal that is derived from the output node 606. The negative input of differential amplifier 616 is connected to node 611. Therefore, error correction can be provided by controlling the conductive path through transistor 614.

The resistor 612 is a ballast resistor to provide ESD protection for transistor 610, and the resistor 630 is provided such that the drain voltage of transistor 624 will track the drain voltage of transistor 610. Resistor 630 is larger than resistor 612, ratioed to the nominal 1/12 ratio described hereinabove.

On the N-channel side, the gate of N-channel transistor 610 is connected to a DAC signal on the gmn node 604. The gmn signal on node 604 also drives the gate of an N-channel transistor 624, with the source thereof connected to ground. The drain of transistor 624 is connected through a series resistor 630 to a node 620, which is connected to the negative input of the differential amplifier 634, similar to differential amplifier 616. The positive input of amplifier 634 is connected to the positive input of differential amplifier 616 and to the output 606. This differential amplifier 634 provides the error correction on the N-channel side, the output thereof connected to the gate of an N-channel transistor 636, the source/drain path thereof connected between the nodes 620 and the gmn terminal 604.

In general, the current driver is designed such that the N-channel transistor 624, in combination with a transistor 636, provide a current source mirrored to a transistor 610. The transistor 610 is operable to provide a quiescent current when current is being sourced by the associated P-channel transistor. The current through transistor 624 is nominally 1/12th the current through transistor 610.

The error amplifier 616 controls the gate of transistor 614 so as to match the drain of transistor 612, such that the drain voltage of transistor 612 tracks the drain voltage of transistor 608. This removes the distortion found in a conventional current mirror (one where transistor 614 is not present). Similarly the error amplifier 634 controls the gate of transistor 636 so as to match the drain of transistor 624, such that the drain voltage of transistor 624 tracks the drain voltage of transistor 610.

Figure 7:
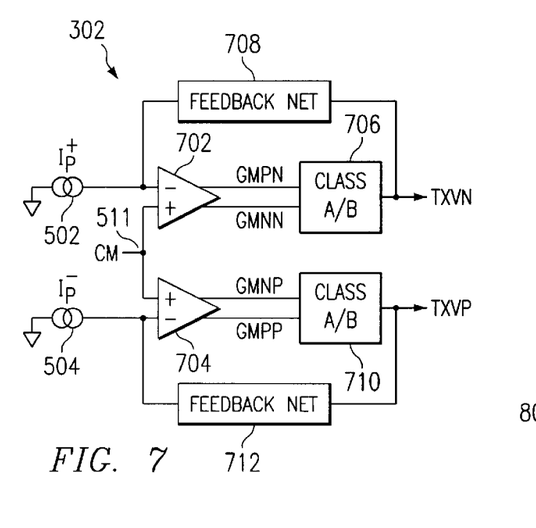
FIG. 7 illustrates a simplified diagram of the voltage driver of FIG. 5.

Referring now to FIG. 7, there is illustrated a more detailed schematic diagram of the voltage driver 302. The positive $I_p$ input from DAC 502 is input to the negative input of a folded cascode amplifier 702, the positive input thereto connected to a common mode voltage on the node 511. A second folded cascode amplifier 704 is provided having the negative input thereof connected to the negative DAC 504 and the positive input thereto connected the node 511 to the common mode voltage. The output of the amplifier 702 is comprised of a positive and a negative differential output gmpn and gmnn, respectively, which are input to a Class AB output stage 706. The output therefrom is the txvn signal. The signal is fed back through a feedback network 708 to the negative input of amplifier 702. Similarly, the two outputs of the amplifier 704 are the gmnp and gmpp outputs which are fed to a Class AB output stage 710, the output of which provides the txvp signal. This is fed back through a feedback network 712 to the negative input of amplifier 704.

Figure 8:
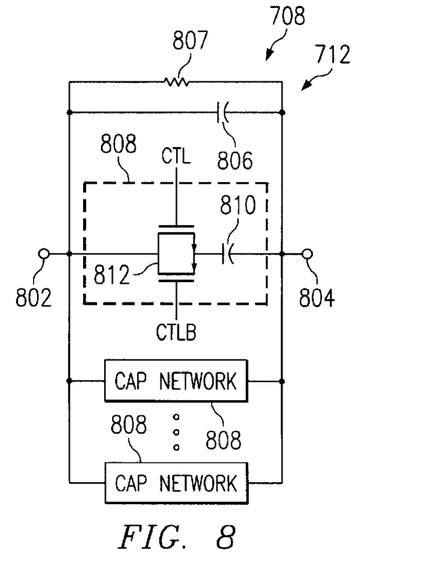
FIG. 8 illustrates a diagram of the feedback network for the embodiment of FIG. 7.

Referring now to FIG. 8, there is illustrated a diagrammatic view of the feedback network 708 and the feedback network 712. There is provided an input 802 and an output 804. Between the input 802 and the output 804 is provided a capacitor 806 in parallel with a resistor 807. This constitutes the base feedback capacitor 806 and the feedback resistor 807. Additionally, there are provided a plurality of selectable capacitive networks 808. Each of these capacitor networks is comprised of a switchable capacitor 810 which is connected in series with an N-channel/P-channel transmission gate 812 between the input 802 and the output 804. Two control signals, CTL and CTLB are provided for rendering the transmission gate 812 conductive or nonconductive. As such, each of the selectable capacitors 808 can be connected in parallel with the capacitor 806 to change the value thereof, this being an external control feature.

Figure 9:
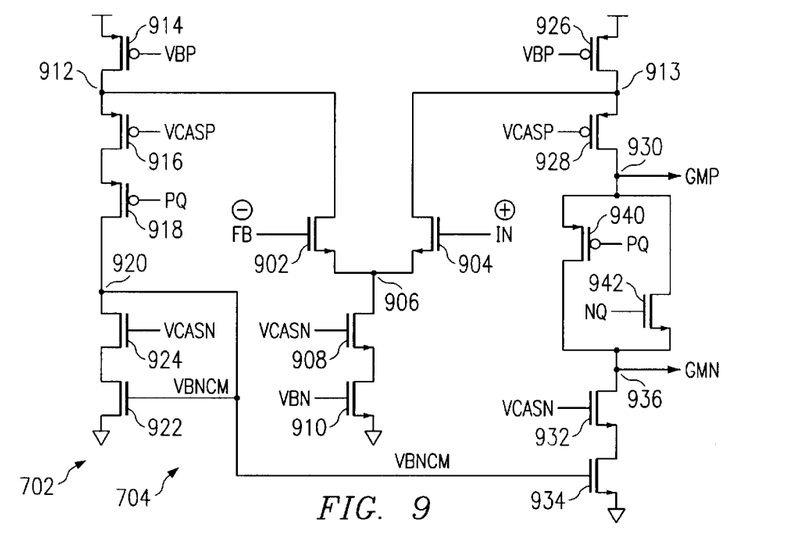
FIG. 9 illustrates a schematic diagram of the differential amplifier for the voltage driver of FIG. 7.

Referring now to FIG. 9, there is illustrated a schematic diagram of the diffential amplifier 702 and the differential amplifier 704. The input is comprised of a diffential pair of N-channel transistors 902 and 904 with a common source connecting to a node 906. Node 906 is connected through two series connected N-channel transistors 908 and 910 to ground, transistor 908 having the gate thereof connected to a cascode bias voltage vcasn, and the transistor 910 having the gate thereof connected to the current source bias voltage vbn. The differential input transistor 902 has the gate thereof connected to the negative feedback signal fb, with the transistor 904 having a gate thereof connected to the positive input signal or the common mode input on node 511 illustrated in FIG. 7. The drain of transistor 902 is connected to a node 912 and the drain of transistor 904 is connected to a node 913.

The node 912 is connected to one leg of the amplifier to provide a cascode operation. A P-channel transistor 914 has the source/drain path thereof connected between $V_{dd}$ and node 912, and the gate thereof connected to a current source bias voltage vbp. A pair of P-channel transistors 916 and 918 are connected in series between node 912 and a node 920, the gate of transistor 916 connected to a cascode bias voltage vcasp and the gate of transistor 918 connected to a p-channel bias voltage pq (this is the PMOS Class AB Quiescent current control voltage). Node 920 is connected to the lower side of the leg for the N-channel portion with two cascoded N-channel transistors 922 and 924 connected in series between node 920 and ground. Transistor 922, having the source thereof connected to ground, has the gate thereof connected to node 920, with the gate of transistor 924 connected to the cascode bias signal vcasn.

The node 913 is connected to a second leg, the output leg, that is also a cascode leg. A P-channel transistor 926 is connected between $V_{dd}$ and node 913, with the gate thereof connected to a current source bias voltage vbp. A cascode P-channel transistor 928 is connected between node 913 and an output node 930 to provide the gmp output signal. The lower portion of the output leg is comprised of two series connected N-channel transistors 932 and 934 between ground and a node 936 representing a gmn output signal. The gate of transistor 934 is connected to vbncm and the gate of transistor 932 is connected to a cascode bias signal vcasn. Between nodes 930 and 936 are provided two parallel connected transistors, a P-channel transistor 940 having the source/drain path thereof connected between nodes 930 and 936 and the gate thereof connected to the bias signal pq (the PMOS Class AB Quiescent current control voltage). The N-channel transistor 942 is connected between nodes 930 and 936 with the gate thereof connected to the n-channel bias signal nq (the NMOS Class AB Quiescent current control voltage).

Figure 10:
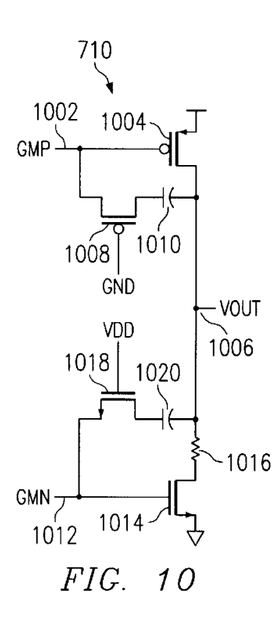
FIG. 10 illustrates a schematic diagram of the class AB output stage for the voltage driver of FIG. 7.

Referring now to FIG. 10, there is illustrated a schematic diagram of the Class AB stage 710. The gmp signal is input on a node 1002 to the gate of a P-channel transistor 1004 having the source/drain path thereof connected between the $V_{dd}$ and the output node 1006. A P-channel transistor 1008 has the source/drain path thereof connected between node 1002 and through a capacitor 1010 to the output node 1006, and the gate thereof connected to ground. The gmn signal is connected to a node 1012 and to the gate of an N-channel transistor 1014. Transistor 1014 has the source/drain path thereof connected to ground and through a series ballast resistor 1016 to the output node 1006. An N-channel transistor 1018 has the source/drain path thereof connected between node 1012 and through a capacitor 1020 to node 1006. The gate of transistor 1018 is connected to the $V_{dd}$.

Figure 11:
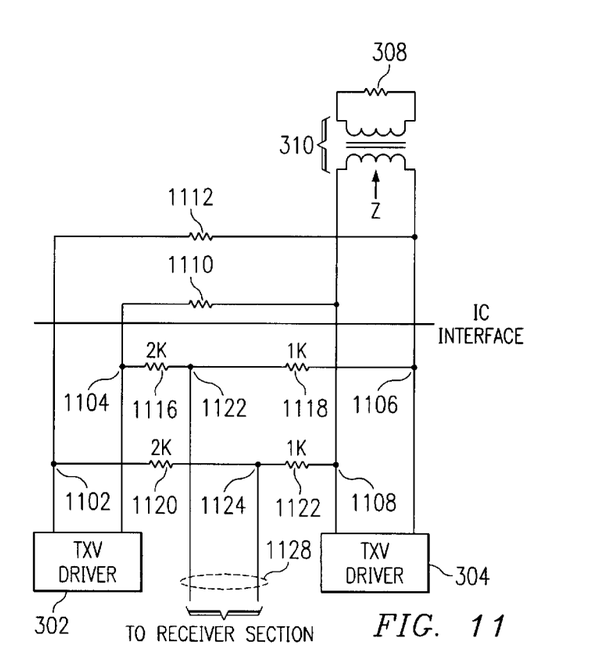
FIG. 11 illustrates a schematic diagram of the hybrid.

Referring now to FIG. 11, there is illustrated a schematic diagram of the on chip hybrid utilizing the present disclosed embodiment. The driver 302 provides the txvn and txvp outputs on nodes 1102 and 1104, respectively. Similarly, the current driver 304 provides two outputs to nodes 1106 and 1108. A resistor 1110 is disposed between nodes 1104 and 1108. The resistor value is 50 ohms. Similarly, a 50 ohm resistor 1112 is disposed between nodes 1102 and 1106. The resistors 1110 and 1112 are the same as the two 50 ohm resistors 318 and 320 illustrated in FIG. 3, these being implemented off chip. To extract the receive signal, a cross resistor leg is provided comprised of two series connected resistors 1116 and 1118, resistor 1116 having a value of 2 k ohms and having one end thereof connected to node 1104 and the other end thereof connected to one end of resistor 1118 and a node 1122. Resistor 1118 has a value of 1 k ohm and has the other side thereof connected to node 1106. A second cross resistor leg is provided comprised of two resistors 1120 and 1122. Resistor 1120 has a value of 2 k ohms and is connected between node 1102 and a node 1124. Resistor 1122 has a value of 1 k ohms and is connected between nodes 1124 and 1108. The receive signal is extracted from node 1122 and node 1124 on two lines 1128.

Although the preferred embodiment has been described in detail, it should be understood that various changes, substitutions and alterations can be made therein without departing from the spirit and scope of the invention as defined by the appended claims.

What is claimed is:

1. A transmission line driver for driving a transmission line in a first operating mode and in a second operating mode, which first and second operating modes operate substantially exclusive of each other, comprising:

a current driver for driving the transmission line in the first operating mode from a first data generator and at a first output voltage; and a voltage driver for driving the transmission line in the second operating mode from a second data generator at a second output voltage through a load, such that said current driver and said voltage driver operate independent of each other.

2. The transmission line driver of claim 1, wherein the transmission line comprises a twisted wire pair.

3. The transmission line driver of claim 2, wherein said twisted wire pair includes a transformer load.

4. The transmission line driver of claim 2, wherein said voltage driver is operable to drive the transmission line and said second output voltage has a peak-to-peak voltage centered about a common mode voltage through said load.

5. The transmission line driver of claim 4, wherein said load comprises a first load for connecting to one of said wires in said twisted wire pair and a second load for connecting to the other of said wires in said twisted wire pair, and said voltage driver comprises:
- a first driver for driving said first load;
- a second driver for driving said second load;
- said first and second drivers operable in a differential manner with said second data generator providing a differential drive thereto; and
- said first and second drivers operating about said common mode voltage.

6. The transmission line driver of claim 5, wherein said voltage driver in said first operating mode, while said current driver is driving the transmission line, is operable to dispose the outputs of said first and second drivers at substantially said common mode voltage.

7. The transmission line driver of claim 1, wherein said first data generator operates at a first data rate and said second data generator operates at a second data rate.

8. The transmission line driver of claim 1, wherein said first output voltage is higher than said second output voltage.

9. The transmission line driver of claim 1, wherein said voltage driver in said first operating mode, while said current driver is driving the transmission line, is operable to dispose the output thereof at a voltage level required by said current driver during the operation thereof in said first operating mode.

10. A transmission system for interfacing with a transmission line between a first end and a second end, each of the first and second ends having a line driver for operating in a first transmission mode and in a second transmission mode which first and second transmission modes operate substantially exclusive of each other at the transmitting one of the first and second ends, the line driver comprising:
- a current driver for driving the transmission line in the first transmission mode from a first data generator and at a first output voltage; and
- a voltage driver for driving the transmission line in the second transmission mode from a second data generator at a second output voltage through a load, such that said current driver and said voltage driver operate independent of each other.

11. The system of claim 10, wherein the transmission line comprises a twisted wire pair.

12. The system of claim 11, wherein said twisted wire pair includes a transformer load.

13. The system of claim 11, wherein said voltage driver is operable to drive the transmission line and said second output voltage has a peak-to-peak voltage centered about a common mode voltage through said load.

14. The system of claim 13, wherein said load comprises a first load for connecting to one of said wires in said twisted wire pair and a second load for connecting to the other of said wires in said twisted wire pair, and said voltage driver comprises:
- a first driver for driving said first load;
- a second driver for driving said second load;
- said first and second drivers operable in a differential manner with said second data generator providing a differential drive thereto; and
- said first and second drivers operating about said common mode voltage.

15. The system of claim 14, wherein said voltage driver in said first transmission mode, while said current driver is driving the transmission line, is operable to dispose the outputs of said first and second drivers at substantially said common mode voltage.

16. The system of claim 10, wherein said first data generator operates at a first data rate and said second data generator operates at a second data rate.

17. The system of claim 10, wherein said first output voltage is higher than said second output voltage.

18. The system of claim 10, wherein said voltage driver in said first transmission mode, while said current driver is driving the transmission line, is operable to dispose the output thereof at a voltage level required by said current driver during the operation thereof in said first transmission mode.

19. A transmission line driver for driving a transmission line, comprising:
- a current driver for differentially driving the transmission line in a current mode in a first operating mode from a first data generator and at a first output voltage about a common mode voltage; and
- a voltage driver for differentially driving the transmission line about said common mode voltage in a second operating mode different from said first operating mode, said voltage driver driving the transmission line from a second data generator at a second ouput voltage through a load, such that said current driver and said voltage driver operate and drive at the respective first and second voltages substantially independent of each other;
- wherein said voltage driver in said first operating mode, while said current driver is differentially driving the transmission line, generates said common mode voltage.

20. The transmission line driver of claim 19, wherein the transmission line comprises a twisted wire pair.

21. The transmission line driver of claim 20, wherein said twisted wire pair includes a transformer load.

22. The transmission line driver of claim 19, wherein said first data generator operates at a first data rate and said second data generator operates at a second data rate.

23. The transmission line driver of claim 19, wherein said first output voltage is higher than said second output voltage.

24. The transmission line driver of claim 19, wherein said voltage driver is operable to drive the transmission line and said second output voltage has a peak-to-peak voltage centered about said common mode voltage through said load.

25. The transmission line driver of claim 24, wherein said load comprises a first load for connecting to one of said wires in said twisted wire pair and a second load for connecting to the other of said wires in said twisted wire pair, and said voltage comprises:
- a first driver for driving said first load;
- a second driver for driving said second load;
- said first and second drivers operable in a differential manner with said second data generator providing a differential drive thereto; and
- said first and second drivers operating about said common mode voltage.

26. The transmission line driver of claim 25, and further comprising a control device to vary the voltage level of said second voltage relative to said first output voltage.

27. The transmission line driver of claim 26, wherein said control device comprises first and second variable feedback networks connected between the input and outputs of said first and second drivers, respectively.

28. The transmission line driver of claim 25, wherein said voltage driver in said first operating mode, while said current driver is driving the transmission line, is operable to dispose the outputs of said first and second drivers at substantially said common mode voltage.

29. The transmission line driver of claim 19, wherein said voltage driver in said first operating mode, while said current driver is driving the transmission line, is operable to dispose the output thereof at a voltage level required by said current driver during the operation thereof in said first operating mode.

30. A network controller integrated circuit for interfacing with a twisted wire pair transmission line with at least two data rates and having a transmission line driver for driving a transmission line at the first data rate or at the second data rate, which first and second data rates operate substantially exclusive of each other, the line driver comprising:

first and second differential current outputs connected to opposite sides of the transmission line;

a differential current driver for driving the transmission line through said first and second differential current outputs with data at the first data rate from a first data generator and at a first output voltage;

first and second differential voltage outputs connected through first and second loads, respectively, to opposite sides of the transmission line; and a voltage driver for driving the transmission line through said first and second loads, voltage outputs and said first and second loads at the second data rate from a second data generator at a second output voltage through a load, such that said current driver and said voltage driver operate independent of each other.

31. The network controller integrated circuit of claim 30, wherein said first output voltage is higher than said second output voltage.

32. The network controller integrated circuit of claim 30, wherein said voltage driver is operable to drive the transmission line and said second output voltage has a peak-to-peak voltage centered about a common mode voltage through said load.

33. The network controller integrated circuit of claim 32, wherein said first load is connected to one of said wires in said twisted wire pair and said second load for connecting to the other of said wires in said twisted wire pair, and said voltage driver comprises:

a first driver for driving said first load;

a second driver for driving said second load;

said first and second drivers operable in a differential manner with said second data generator providing a differential drive thereto; and said first and second drivers operating about said common mode voltage.

34. The network controller integrated circuit of claim 33, wherein said voltage driver is operable to dispose the outputs of said first and second drivers at substantially said common mode voltage when said current driver is operating at the first data rate.

35. The network controller integrated circuit of claim 33, and further comprising a control device to vary the voltage level of said second output voltage relative to said first output voltage.

36. The network controller integrated circuit of claim 35, wherein said control device comprises first and second variable feedback networks connected between the input and outputs of said first and second drivers, respectively.

37. The network controller integrated circuit of claim 35, wherein said control device is operable to vary in accordance with information received from a source external to the integrated circuit.

38. The network controller integrated circuit of claim 30, wherein said voltage driver is operable to dispose the output thereof at a voltage level required by said current driver during the operation thereof the first data rate.

39. A transmission line driver for driving a transmission line, comprising:

a current driver for driving the transmission line from a first data generator and at a first output voltage;

a voltage driver for driving the transmission line from a second data generator at a second output voltage through a load; and a controller for controlling which of said current driver and said voltage driver provide drive to the transmission line.

40. The transmission line driver of claim 39, wherein said controller determines how much of the drive to the transmission line is generated by either said voltage driver or said current driver.

41. A transmission line driver for driving a transmission line, comprising:

a current driver for differentially driving the transmission line in a current mode in a first operating mode from a first data generator and at a first output voltage about a common mode voltage with said current driver connected to first and second current drive terminals; and a voltage driver for differentially driving the transmission line about said common mode voltage in a second operating mode different from said first operating mode, said voltage driver driving the transmission line from a second data generator at a second ouput voltage through first and second voltage drive terminals;

said first and second current drive terminals connected across the transmission line;

said first and second voltage drive terminals connected through first and second series loads to the transmission line, such that said current driver and said voltage driver operate and drive at the respective first and second voltages.

* * * * *